Figure 1:
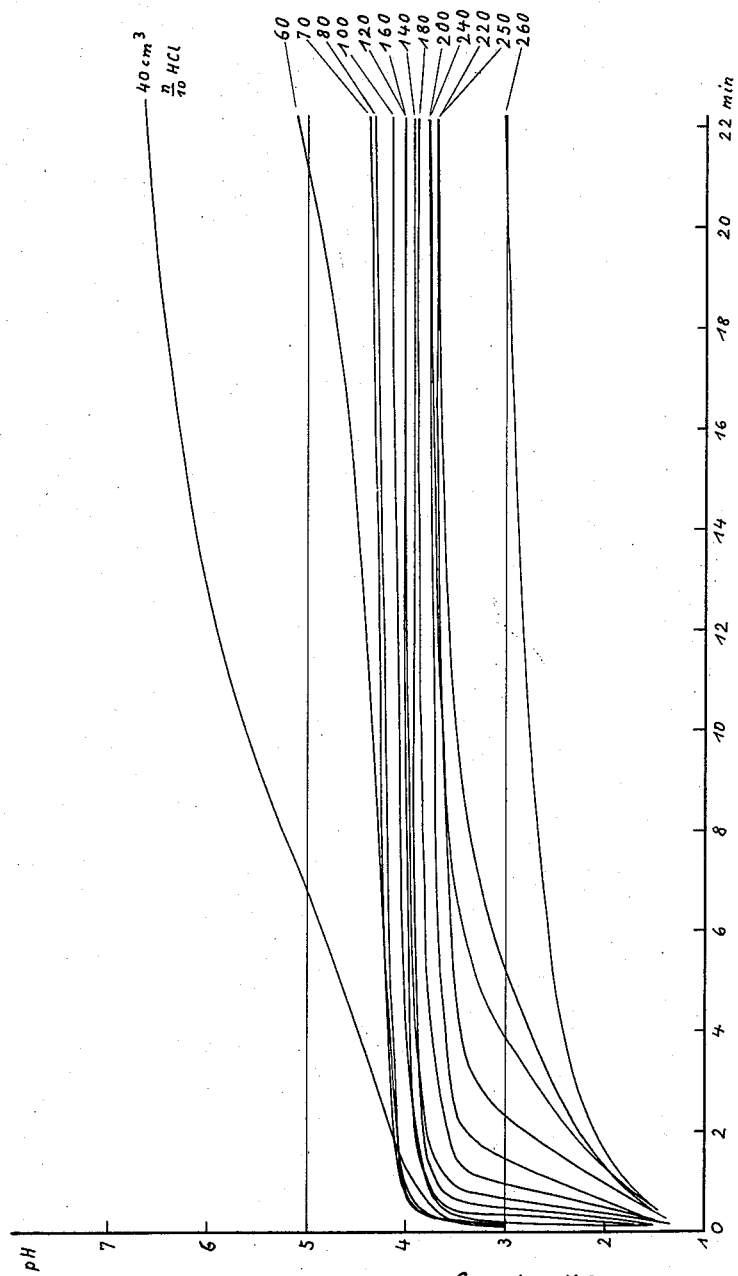

Feb. 2, 1960

G. HALLMANN 2,923,660

PROCESS FOR THE PREPARATION OF MAGNESIUM
ALUMINATE HYDRATE, AND THERAPEUTIC
AGENTS SO PRODUCED

Filed July 17, 1956

6 Sheets-Sheet 1

Günther HALLMANN
INVENTOR
by A. John Michel
ATTORNEY

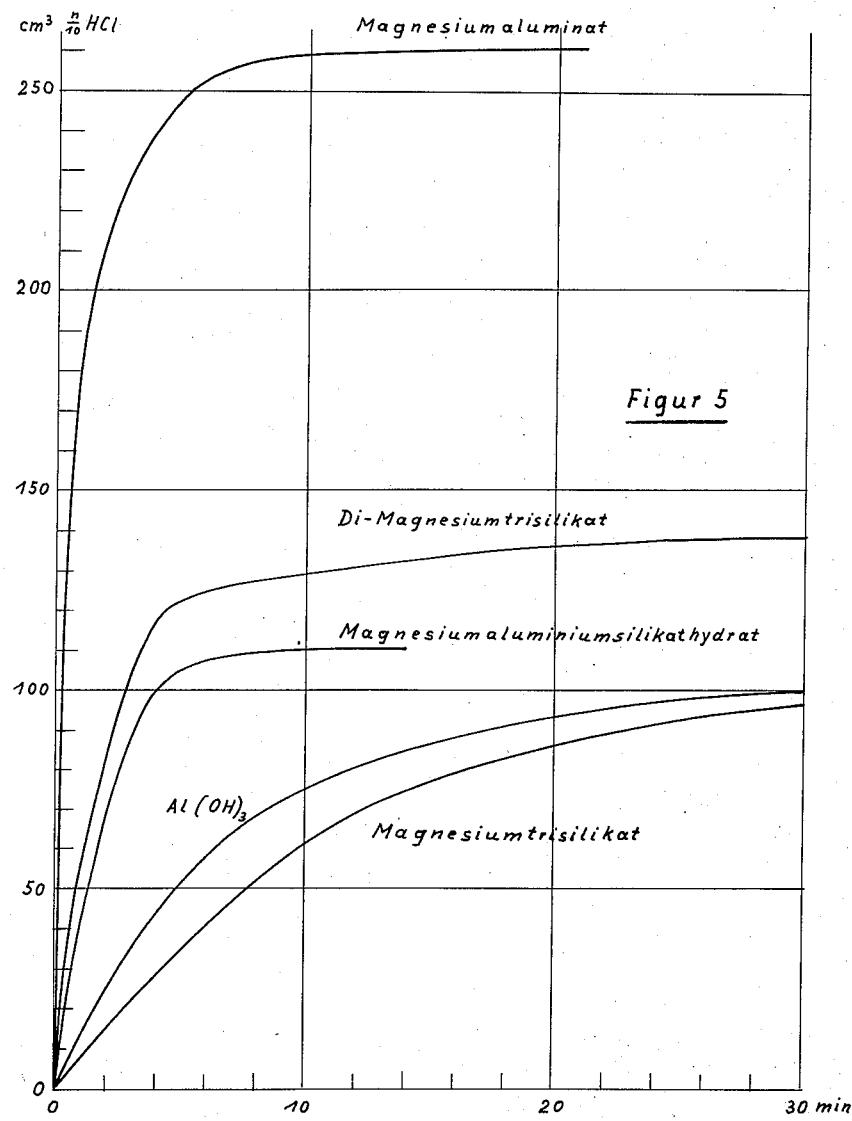

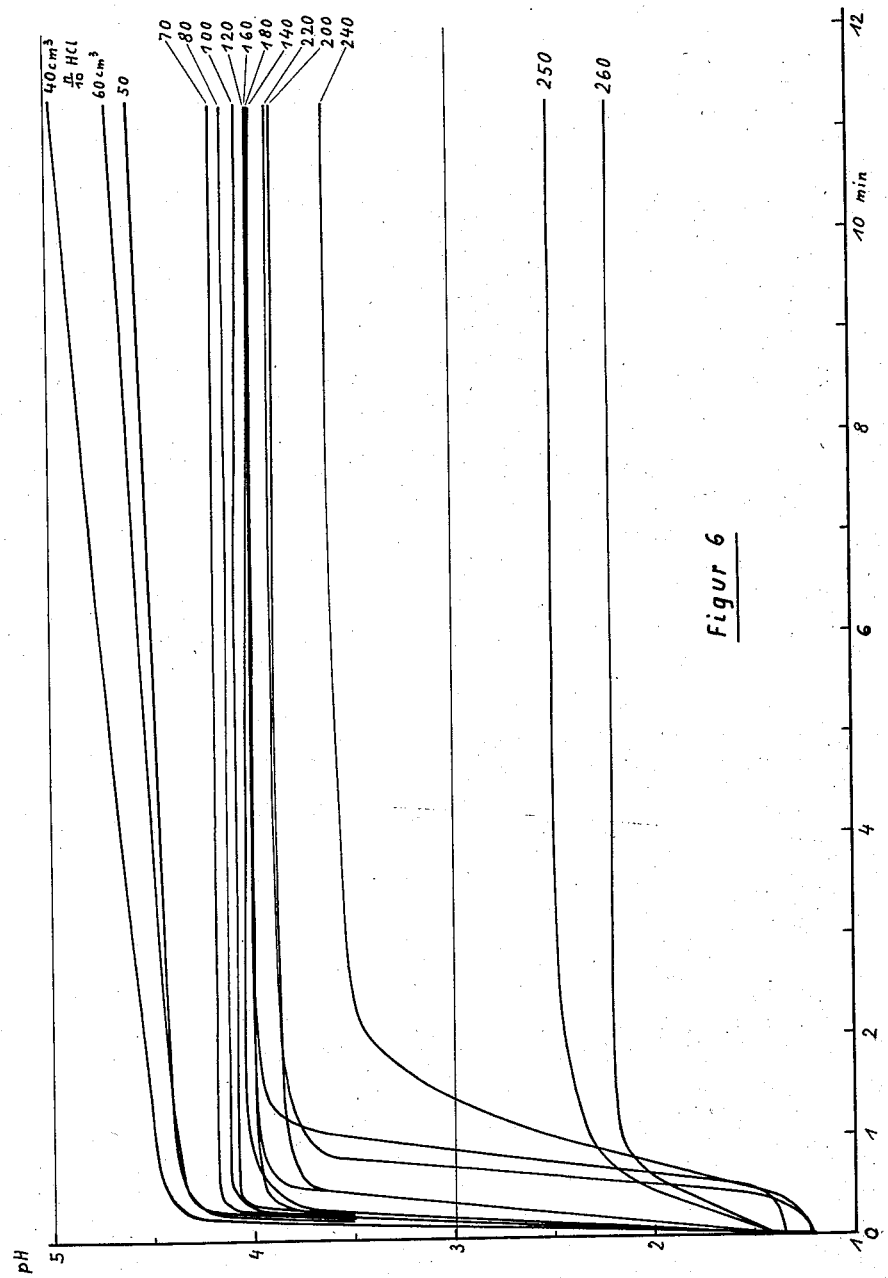
Figur 6
Günther HALLMANN
INVENTOR
By A. John Michel
ATTORNEY

United States Patent Office 2,923,660
Patented Feb. 2, 1960

2,923,660

PROCESS FOR THE PREPARATION OF MAGNESIUM ALUMINATE HYDRATE, AND THERAPEUTIC AGENTS SO PRODUCED

Günther Hallmann, Konstanz, Germany, assignor to Byk-Gulden Lomberg Chemische Fabrik G.m.b.H., Konstanz, Germany, a corporation of Germany Application July 17, 1956, Serial No. 598,443

Claims priority, application Germany August 5, 1955

13 Claims. (Cl. 167—55)

The present invention relates to antacids, and more particularly to a process for the preparation of magnesium aluminate hydrate. The novel therapeutic agents of this invention have a great buffer capacity against acids, such as hydrochloric acid, stabilizing the pH-value in a range between 3 and 5. They are of great medicinal value as an antacid against stomach hyperacidity.

Heretofore, weak bases or alkaline reacting substances, such as sodium bicarbonate, magnesium oxide, magnesium carbonate and calcium carbonate, have been used to counteract hyperacidity by neutralizing the acid in the stomach under the formation of salts and possibly carbon dioxide. The neutralization, however, stimulates renewed production of acid so that a strongly acidic pH-value reappears in the stomach acid shortly thereafter and, particularly after prolonged administration of such neutralizing agents, the acid production in the stomach increases steadily.

Acid buffer substances have also been suggested, such as activated aluminum hydroxide, magnesium trisilicate and magnesium aluminum silicate hydrate, which weaken the acidity to a pH-value of about 3 to 5 and thus tend to reduce the stimulation of renewed acid formation. A similar buffer, i.e. aluminum caseinate, has been described in U.S. Patent No. 2,721,861.

It is the principal object of the present invention to produce an effective antacid of considerably increased buffer capacity which loses none or little of its effectiveness in storage.

Spinel has been considered as magnesium aluminate although recent investigations indicate that spinels may rather be double oxides (Karl A. Hofmann, Anorganische Chemie, 14th edition, Friedr. Vieweg & Sohn, Brunswick, 1951). The synthesis of spinels has been proposed, as witnessed by Swiss Patent No. 128,889 and German Patents Nos. 466,310, 506,146 and 508,460. In all of these processes, high temperatures are used to form melts. The products of all of these processes are totally useless as therapeutic agents.

Magnesium aluminate solutions have been prepared by treating amalgamated aluminum with a magnesium hydroxide solution.

The preparation of magnesium aluminate with the formula $MgO.Al_2O_3.4H_2O$ is described by J. Prased (Collect. Trav. Chim. Tchecoslovaquie, 2 (1930), 661). Here, magnesium peraluminate, which is converted to a magnesium chloride solution by the addition of a potassium aluminate solution in the presence of hydrogen peroxide, is heated to 105° C.

According to German Patent No. 70,175, a substance of the composition $Al_2O_3+MgCO_3+3H_2O+K_2CO_3$ is prepared by slowly adding magnesium bicarbonate to a potassium aluminate solution, or vice versa, under the simultaneous addition of carbon dioxide. Abich (Ann. d. Physik, 23 (1831), 355) describes the preparation of a product, of which no formula is given, by adding ammonia to an equimolar solution of an aluminum and magnesium salt in the presence of considerable amounts of ammonium chloride. It is doubtful whether this product is a magnesium aluminate but, in any event, it contains considerable amounts of ammonia in the molecule.

All of the above magnesium-aluminum compounds have little or no use for therapeutic purposes because their buffer capacity is nil or next to nil.

It is an essential characteristic of all previously described magnesium aluminates that the atomic ratio of magnesium to aluminum is always 1:2, insofar as formulae are given. In contrast thereto, the magnesium aluminate hydrates of the present invention have a magnesium:aluminum:water ratio of 4:2:9, leading to the assumption, fortified by certain other tests hereinbelow described, that the formula of the novel compound is

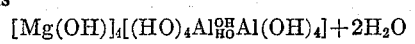

However, it should be clearly understood that this formula is tentative and that the invention is in no way limited to any specific theory in connection therewith.

H. le Chatelier (Compt. rend., 96 (1883), 1058) describes the preparation of an earth alkali metal aluminate having an atomic ratio of earth alkali metal to aluminum of 2:1. He produced calcium aluminate having the formula $4CaO.Al_2O_3.12H_2O$ by adding an aluminate to an equal volume of a calcium hydroxide solution and subsequently drying the reaction mixture. On the other hand, the only known barium aluminates have a barium:aluminum ratio of 1:1 (German Patents Nos. 93,857 and 244,221).

In accordance with the present invention, a magnesium aluminate hydrate with excellent acid buffer capacity is prepared by adding a magnesium salt solution to a strongly alkaline alkali aluminate solution, which contains 3–5 mols $Na_2O$ or another alkali metal oxide per $Al_2O_3$ mol, at a temperature not exceeding 50° C., preferably 30° C., and as low as slightly above freezing, under intensive stirring, the amount of magnesium salt solution being such that the ratio of aluminum to magnesium is 1:0.9–3. The lower pH limit of the alkali aluminate solution is preferably no less than 12, preferably 13. The resultant magnesium aluminate hydrate is separated from the aqueous solution, washed and, if desired, carefully dried.

A suitable alkali aluminate solution may be obtained, for instance, by reacting one mol of an aluminum salt, such as aluminum chloride, bromide, sulfate or nitrate, with 6–8 mols of an alkali metal hydroxide, for instance sodium hydroxide. Preferred alkali aluminate solutions contain four mols of $Na_2O$ per mol of $Al_2O_3$ and may be obtained by reacting one mol of an aluminum salt with seven mols of sodium hydroxide.

Any neutral reacting magnesium salt solution may be used, such as for instance the sulfate, chloride, nitrate, bromide, iodide, sulfide, acetate, etc. For reasons of economy, the cheap and highly soluble salts, such as magnesium sulfate or magnesium chloride, are preferred.

The intensive stirring of the reaction mixture may be effected by using a high-velocity rotary agitator while the magnesium salt solution is introduced in the reaction vessel in a thin jet. Preferably, a shower head is used to produce several jets.

The aluminum:magnesium atom ratio of 1:2 has been found most advantageous because these products are obtained with the highest yields and have the most effective therapeutic capacity.

If the above ratios are not observed, such as for instance by using an aluminate solution containing a smaller amount of excess alkali hydroxide or by adding a smaller or larger amount of magnesium salt to the aluminate solution, the yields are decreased considerably and the products have considerably less or substantially no therapeutic value. The most effective therapeutic agents and the best yields are obtained when the alkali aluminate solution contains four mols of alkali oxide per mol of $Al_2O_3$ and when this solution is reacted with such an amount of magnesium salt that the ratio of the aluminum to magnesium in the reaction mixture is 1 to 2. It should also be noted that higher reaction temperatures reduce the effectiveness of the therapeutic agents produced by the process of this invention.

Furthermore, it is important to effect intimate mixing during addition of the magnesium salt solution to the aluminate solution to obtain a valuable product, such mixing preventing any localized excess of magnesium salt in the reaction mixture. It is, therefore, preferred to add the magnesium salt to the aluminate solution in the form of a thin jet while stirring thoroughly. In the case of large charges, the jet is preferably divided into a multitude of sprays, for instance by introducing the magnesium salt solution into the aluminate solution through a shower head.

In a slight variation of the above-described process, it is also possible to introduce both the magnesium salt solution and the alkali aluminate solution in thin jets into a vessel containing water or a previously prepared magnesium aluminate hydrate, while thoroughly stirring the reaction mixture. However, this modification of the process has no particular advantage but, to the contrary, the products obtained thereby appear to be less effective antacids.

The magnesium aluminate hydrate may be separated from the aqueous reaction mixture by filtration or by centrifugal action. Dissolved, water-soluble salts, such as sodium sulfate, sodium chloride and the like, as well as any excess magnesium sulfate may be removed by washing the magnesium aluminate hydrate with ion-free water or by decanting several times. Dialysis could also be used to purify the hydrate but this method appears to have no particular advantages. Preferably, the removal of the water-soluble salts is continued until the magnesium aluminate hydrate contains at most ½% of such salts.

The most magnesium aluminate hydrate obtained in the above-described method may be used as an antacid in this form, for instance as a diluted suspension in water; if desired, other medication, inactive agents or aromatics may be added to the suspension.

If it is desired, however, to use the antacid in the form of powder or tablets, the magnesium aluminate hydrate must be dried. Drying should be performed under carefully regulated conditions to avoid a loss of therapeutic effectiveness. Generally, the drying temperature should not exceed 70° C. and should preferably be below 60° C. Drying under lower than atmospheric pressure will expedite the drying under these relatively low temperatures. On the other hand, little loss in effectiveness will be encountered with drying at temperatures of about 110° C. if the drying time is held short, i.e. 1–2 minutes.

Roller or spray drying may be used for this purpose, for instance.

The dried product should be thoroughly comminuted unless it is already a powder, such as results from spray drying. Ball or vibratory mills may be used to pulverize the dried product. The finer the powder, the speedier is the therapeutic action of the antacid. The most effective and speediest acting therapeutic agents are obtained when the dried mass is comminuted to 2500 mesh size, preferably 3600 mesh. The best buffer capacity is exhibited by products obtained by spray drying since they are unusually fine and have, therefore, the largest active surface area. Spray drying may be effected with 6 to 15% suspensions of magnesium aluminate hydrate at temperatures between 60 and 100° C.

As long as the reaction constituents are kept within the above-described quantity limits, the reaction products always appear to have about the same composition with the general formula

$$[Mg(OH)]_4[(HO)_4Al\overset{OH}{\underset{HO}{}}Al(OH)_4] + 2H_2O$$

Depending on the thoroughness of washing the reaction product, it will contain some additional ions, such as sulfate and sometimes carbonate ions, particularly in the form of magnesium sulfate and magnesium carbonate, possibly also as alkali sulfate, etc. Taking these impurities into account, the end products always conform to the above formula, the water content varying somewhat in relation to the degree of drying. Another reason for the assumption that this formula corresponds to the actual composition is seen in the fact that the best yields and most effective products are obtained when the above-mentioned optimal conditions are observed in the preparation of the products. In this case, the yield, based on the aluminum as well as the magnesium in the reaction mixture, is almost quantitative while it decreases with conditions deviating from the optimum, the yield then being dependent on the reaction constituent which is present in quantities below optimum.

Furthermore, if any ion impurities in the end product are taken into account, analysis always shows an aluminum:magnesium ratio of 1:1.8, corresponding to a mol ratio of 1:2, while the water loss with well dried preparations shows an aluminum:water mol ratio of 2:9.

Figure 4:
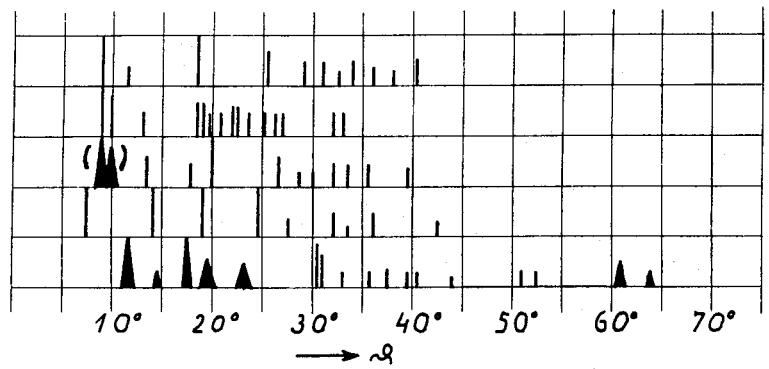

The assumed formula for the magnesium aluminate of the present invention also corresponds fully to the formula for hydroxy aluminate ions given by Brintzinger (see Karl A. Hofmann, Anorganische Chemie, 14th edition, Friedr. Vieweg & Sohn, Brunswick, 1951, 511). Figs. 4 and 7 show the characteristic Debye-Scherrer diagram which is clearly distinguished from the diagrams of different aluminum oxides and hydroxides as well as magnesium hydroxide and which shows a crystalline structure. It has also been found that mixtures of magnesium hydroxide and aluminum hydroxide, both of which were obtained by precipitation and dried carefully, in which mixtures the ratio of magnesium:aluminum was the same as in the hydrates of this invention, had a buffer effect clearly distinguished from that of magnesium aluminate hydrate.

As already mentioned, the magnesium aluminates described up to now according to Hofmann, Anorganische Chemie, 14th edition, page 510, must be looked at correctly as double oxides of magnesium and aluminum with water. The new compound obtained according to the invention on the other hand is a real magnesium aluminate hydrate, as may already be seen from the formula. The ratio of gram atoms magnesium to gram atoms aluminum amounts in contradistinction to the known "magnesium aluminates" to 2:1, whilst the ratio magnesium:aluminum:$H_2O$ amounts to 4:2:9, the water content being somewhat variable depending on the degree of dryness. This compound is soluble in diluted (n/10) hydrochloric acid in the cold. Its watery suspension shows a pH-value of 9–11 and 1 mol of the new compound binds up to 14 mol hydrochloric acid. The compound is a white powder which is nearly tasteless and absolutely without smell.

With a very great number of people tablets containing the new compounds according to the invention have been tested clinically. Persons having a hyperacidity (an excess of acidity) due to certain diseases of the stomach (ulcus ventriculi, ulcus duodeni, gastritis) and persons with healthy stomachs after provocation of acid by means of caffein and alcohol have been tested. The pH-values were directly measured intra-gastrically by means of a bismuth element.

It was found that after use of a product according to the invention consisting of magnesium aluminate hydrate, a binding of the acid is quickly obtained up to a range of pH 3–5 the effect being maintained generally for 40–60 minutes, i.e. up to the point when the substance is withdrawn from the stomach, the pains disappear at once. Any incompatibility could not be observed, also not as far as the intestine is concerned, and even not after having taken the product for a long time; thus the product is very suitable for permanent therapeutical use.

The following examples serve to illustrate the practice

The small residue on the sieve was again pulverized and passed through the same sieve. The yield was 261 g., i.e. 98% of theoretical based on the magnesium in the reaction and 59% based on the aluminum salt, if the assumed formula of the product is used as a basis for the calculations.

Although the ratio of aluminum:magnesium is about 1:1.21 in the charges used in the reaction, the magnesium aluminate hydrate showed an aluminum:magnesium ratio of 1:2 in the analysis of the end product, taking into account the sulfate, chloride and carbonate impurities contained therein.

The extraordinary effectiveness and capacity of the product as an acid buffer was attested by the following series of experiments:

In each instance, 1 g. of the magnesium aluminate hydrate was added to the given amount of n/10 hydrochloric acid the pH-value was then repeatedly measured in short time intervals, the pH measuring instrument having been adjusted at the beginning of each test. Table 1 shows the results of these tests, the values of Table 1 having been entered on Fig. 1 to obtain the curves illustrating the antacid effectiveness of the product.

*Table 1*

| ccm. n/10 HCl: | | | | | | | | | | | | | | | | | | |
|---|---|---|---|---|---|---|---|---|---|---|---|---|---|---|---|---|---|---|
| 40 | Time | 8″ | 15″ | 40″ | 60″ | 90″ | 2′ | 3′ | 4′ | 5′ | 9′ | 12′ | 15′ | 20′ | 25′ | 28′ | | |
|    | pH   | 3.00 | 3.60 | 3.80 | 3.90 | 4.05 | 4.14 | 4.30 | 4.48 | 4.66 | 5.42 | 5.90 | 6.20 | 6.52 | 6.71 | 6.80 | | |
| 60 | Time | 9″ | 30″ | 45″ | 60″ | 1.5′ | 2′ | 3′ | 4′ | 5′ | 10′ | 12′ | 15′ | 20′ | 25′ | 28′ | | |
|    | pH   | 3.00 | 3.86 | 3.94 | 4.00 | 4.06 | 4.07 | 4.12 | 4.16 | 4.19 | 4.33 | 4.49 | 4.52 | 4.87 | 5.28 | 5.52 | | |
| 70 | Time | 9″ | 30″ | 45″ | 60″ | 1.5′ | 2′ | 3′ | 5′ | 10′ | 14′ | 20′ | 24′ | 28′ | | | | |
|    | pH   | 3.00 | 3.94 | 4.01 | 4.04 | 4.08 | 4.11 | 4.14 | 4.19 | 4.25 | 4.28 | 4.34 | 4.38 | 4.42 | | | | |
| 80 | Time | 10″ | 30″ | 45″ | 60″ | 1.5′ | 2′ | 3′ | 5′ | 10′ | 12′ | 15′ | 18′ | 20′ | 25′ | 28′ | | |
|    | pH   | 3.00 | 3.90 | 3.98 | 4.02 | 4.06 | 4.07 | 4.10 | 4.14 | 4.20 | 4.22 | 4.25 | 4.28 | 4.30 | 4.32 | 4.34 | | |
| 100 | Time | 8″ | 16″ | 30″ | 45″ | 60″ | 1.5′ | 2′ | 3′ | 5′ | 8′ | 10′ | 15′ | 20′ | 25′ | 28′ | | |
|     | pH   | 1.50 | 3.00 | 3.64 | 3.73 | 3.79 | 3.84 | 3.89 | 3.94 | 4.00 | 4.04 | 4.06 | 4.09 | 4.13 | 4.14 | 4.15 | | |
| 120 | Time | 10″ | 18″ | 22″ | 30″ | 45″ | 1′ | 1.5′ | 2′ | 3′ | 5′ | 8′ | 10′ | 20′ | 24′ | 28′ | | |
|     | pH   | 1.70 | 2.50 | 3.00 | 3.60 | 3.70 | 3.78 | 3.85 | 3.89 | 3.93 | 3.96 | 3.98 | 3.99 | 4.01 | 4.01 | 4.01 | | |
| 140 | Time | 10″ | 18″ | 24″ | 30″ | 37″ | 60″ | 1.5′ | 2′ | 3′ | 5′ | 7′ | 10′ | 20′ | 24′ | 28′ | | |
|     | pH   | 1.50 | 2.00 | 2.50 | 3.00 | 3.50 | 3.70 | 3.79 | 3.83 | 3.88 | 3.91 | 3.92 | 3.94 | 3.94 | 3.94 | 3.94 | | |
| 160 | Time | 10″ | 24″ | 33″ | 42″ | 54″ | 1.25′ | 1.5′ | 2′ | 3′ | 5.0′ | 7′ | 10′ | 20′ | 24′ | 28′ | | |
|     | pH   | 1.35 | 2.00 | 2.50 | 3.00 | 3.50 | 3.67 | 3.71 | 3.78 | 3.84 | 3.91 | 3.94 | 3.97 | 4.00 | 4.01 | 4.01 | | |
| 180 | Time | 15″ | 30″ | 45″ | 58″ | 1.25′ | 1.5′ | 2′ | 2.5′ | 3′ | 5′ | 8′ | 10′ | 20′ | 24′ | 28′ | | |
|     | pH   | 1.50 | 2.00 | 2.50 | 3.00 | 3.41 | 3.50 | 3.57 | 3.63 | 3.68 | 3.77 | 3.84 | 3.86 | 3.88 | 3.88 | 3.88 | | |
| 200 | Time | 15″ | 30″ | 45″ | 1′ | 1.25′ | 1.5′ | 2′ | 3′ | 4′ | 5′ | 7′ | 10′ | 20′ | 24′ | 28′ | | |
|     | pH   | 1.50 | 1.80 | 2.10 | 2.45 | 2.78 | 2.07 | 3.40 | 3.54 | 3.60 | 3.64 | 3.69 | 3.72 | 3.77 | 3.78 | 3.78 | | |
| 220 | Time | 15″ | 30″ | 45″ | 60″ | 90″ | 1.75′ | 2′ | 2.5′ | 3′ | 4′ | 5′ | 10′ | 20′ | 24′ | 28′ | | |
|     | pH   | 1.35 | 1.57 | 1.80 | 2.02 | 2.44 | 2.62 | 2.79 | 3.10 | 3.30 | 3.46 | 3.52 | 3.64 | 3.70 | 3.70 | 3.70 | | |
| 240 | Time | 30″ | 45″ | 60″ | 2′ | 3′ | 4′ | 5′ | 6′ | 7′ | 8′ | 10′ | 13′ | 20′ | 24′ | 28′ | | |
|     | pH   | 1.50 | 1.70 | 1.86 | 2.36 | 2.72 | 3.03 | 3.30 | 3.42 | 3.53 | 3.58 | 3.64 | 3.70 | 3.75 | 3.77 | 3.79 | | |
| 250 | Time | 30″ | 45″ | 60″ | 1.5′ | 2′ | 3′ | 4′ | 5′ | 7′ | 10′ | 12′ | 15′ | 20′ | 24′ | 28′ | | |
|     | pH   | 1.56 | 1.72 | 1.86 | 2.10 | 2.27 | 2.54 | 2.76 | 2.96 | 3.25 | 3.49 | 3.56 | 3.62 | 3.68 | 3.71 | 3.73 | | |
| 260 | Time | 25″ | 45″ | 60″ | 2′ | 3′ | 4′ | 5′ | 6′ | 8′ | 9′ | 10′ | 15′ | 20′ | 24′ | 28′ | | |
|     | pH   | 1.50 | 1.70 | 1.82 | 2.13 | 2.31 | 2.43 | 2.54 | 2.59 | 2.70 | 2.75 | 2.79 | 2.92 | 2.99 | 3.03 | 3.06 | | | of the present invention without, however, delimiting its scope.

EXAMPLE I

A solution of 500 g. (2.08 mol) aluminum chloride+$6H_2O$ in one litre of water was reacted, under constant stirring, with 1.1 litre of caustic soda which contained 500 g. (12.5 mol) of NaOH. After temporary precipitation of aluminum hydroxide, a clear sodium aluminate solution was obtained. After cooling to about 20° C., 1.1 litre of a magnesium sulfate solution containing 300 g. (2.5 mol) magnesium sulfate was added to the sodium aluminate solution in the form of a thin jet while the reaction mixture was stirred constantly and intensively. A colorless, colloidal precipitation was formed and stirred thoroughly for about 15 minutes, whereupon it was filtered by suction. The raw product thus obtained was washed with water until it contained only about ½% water-soluble salts. After drying for 12 hours in a vacuum apparatus at 60° C. and under a pressure of 12 mm. Hg, the product had the form of hard pieces. The pieces were comminuted to powder in a ball mill and the powder was passed through a sieve (3600 meshes per square centimeter).

The above table and Fig. 1 show that 1 g. of magnesium aluminate hydrate will buffer 70 to 260 ccm. of n/10 HCl sufficiently to bring the pH to a value of 3 to 5. The buffer effect is nearly exhausted at 260 ccm. The adjustment of the final pH value takes some time. It is also of interest that the solution becomes increasingly clearer the more hydrochloric acid is added and, beginning with about 200 ccm. of HCl, the solution is practically clear and only an insignificant fraction remains undissolved.

As a control, a mixture of magnesium hydroxide and aluminum hydroxide was prepared by precipitating the hydroxides from their respective salt solutions (aluminum chloride and magnesium sulfate) with the calculated amounts of caustic soda at low temperatures, washing the hydroxides and drying them under controlled conditions, the ratio of the mixture being such that the molar ratio of magnesium:aluminum was 2:1. An amount of this mixture containing the same amounts by weight of magnesium and aluminum as were contained in 1 g. of the magnesium aluminate hydrate prepared according to Example I was added to given amounts of n/10 HCl and the pH values were again measured, with the results shown in Table 2 and illustrated in Fig. 2.

Table 2

| ccm. n/10 HCl: | | | | | | | | | | | | | | | | |
|---|---|---|---|---|---|---|---|---|---|---|---|---|---|---|---|---|
| 40 | Time | 6″ | 40″ | 70″ | 2′ | | | | | | | | | | | |
| | pH | 3.00 | 9.10 | 9.20 | 9.28 | | | | | | | | | | | |
| 60 | Time | 12″ | 25″ | 45″ | 60″ | 90″ | 2′ | | | | | | | | | |
| | pH | 3.00 | 8.30 | 8.70 | 8.90 | 9.10 | 9.10 | | | | | | | | | |
| 80 | Time | 14″ | 30″ | 45″ | 60″ | 75″ | 90″ | 2′ | | | | | | | | |
| | pH | 3.00 | 7.80 | 8.30 | 8.50 | 8.70 | 8.80 | 8.90 | | | | | | | | |
| 100 | Time | 15″ | 27″ | 40″ | 50″ | 60″ | 75″ | 90″ | 1.25′ | 2′ | 2.25′ | 2.5′ | 2.75′ | 3′ | | |
| | pH | 1.60 | 3.00 | 4.70 | 5.20 | 5.50 | 6.20 | 7.00 | 7.90 | 8.10 | 8.30 | 8.40 | 8.50 | 8.60 | | |
| 120 | Time | 10″ | 15″ | 25″ | 43″ | 60″ | 90″ | 2′ | 2.50′ | 3′ | 3.5′ | 3.75′ | 4′ | 4.25′ | 4.75′ | 5′ |
| | pH | 1.40 | 1.70 | 2.00 | 3.00 | 4.20 | 4.60 | 4.90 | 5.40 | 6.20 | 7.50 | 7.80 | 8.00 | 8.20 | 8.30 | 8.40 |
| 140 | Time | 10″ | 40″ | 1.5′ | 2′ | 3′ | 3.5′ | 4′ | 5′ | 5.5′ | 6′ | 6.5′ | 7′ | 8′ | 9′ | 10′ |
| | pH | 1.20 | 4.40 | 5.10 | 5.40 | 5.80 | 6.00 | 6.20 | 6.60 | 6.80 | 7.10 | 7.30 | 7.50 | 7.80 | 8.00 | 8.10 |
| 160 | Time | 15″ | 30″ | 1′ | 1.5′ | 2′ | 3′ | 3.5′ | 4′ | 5′ | 7′ | 12′ | 17′ | 22′ | 27′ | |
| | pH | 1.30 | 1.50 | 1.60 | 1.70 | 1.80 | 3.30 | 4.10 | 4.30 | 4.50 | 4.60 | 4.90 | 5.30 | 5.50 | 5.75 | |
| 180 | Time | 30″ | 1′ | 1.25′ | 1.75′ | 2.25′ | 3.00′ | 5′ | 10′ | 12′ | 15′ | 20′ | 22′ | 24′ | 26′ | 28′ |
| | pH | 1.50 | 2.00 | 2.15 | 2.23 | 2.26 | 2.28 | 2.32 | 2.4 | 2.418 | 2.44 | 2.48 | 2.51 | 2.52 | 2.53 | 2.54 |
| 200 | Time | 30″ | 1′ | 2′ | 3′ | 5′ | 6′ | 7′ | 8′ | 9′ | 10′ | 12′ | 13′ | 14′ | 15′ | 16′ |
| | pH | 1.50 | 1.58 | 1.65 | 1.72 | 1.84 | 1.90 | 1.91 | 1.92 | 1.92 | 1.93 | 1.94 | 1.94 | 1.94 | 1.94 | |
| 220 | Time | 30″ | 45″ | 1′ | 3′ | 5′ | 7′ | 8′ | 9′ | 10′ | 11′ | | | | | |
| | pH | 1.35 | 1.40 | 1.43 | 1.52 | 1.56 | 1.64 | 1.68 | 1.70 | 1.70 | 1.70 | | | | | |
| 240 | Time | 15″ | 30″ | 45″ | 1′ | 2′ | 3′ | 4′ | 5′ | 6′ | 7′ | 8′ | 9′ | 10′ | 11′ | 12′ |
| | pH | 1.26 | 1.32 | 1.35 | 1.37 | 1.42 | 1.46 | 1.48 | 1.50 | 1.51 | 1.52 | 1.54 | 1.54 | 1.55 | 1.60 | 1.60 |
| 260 | Time | 15″ | 30″ | 45″ | 1′ | 3′ | 5′ | 6′ | 7′ | 8′ | 9′ | 10′ | 11′ | 12′ | 14′ | |
| | pH | 1.24 | 1.26 | 1.28 | 1.28 | 1.35 | 1.38 | 1.39 | 1.40 | 1.41 | 1.42 | 1.44 | 1.46 | 1.46 | 1.47 | |

Figure 2:
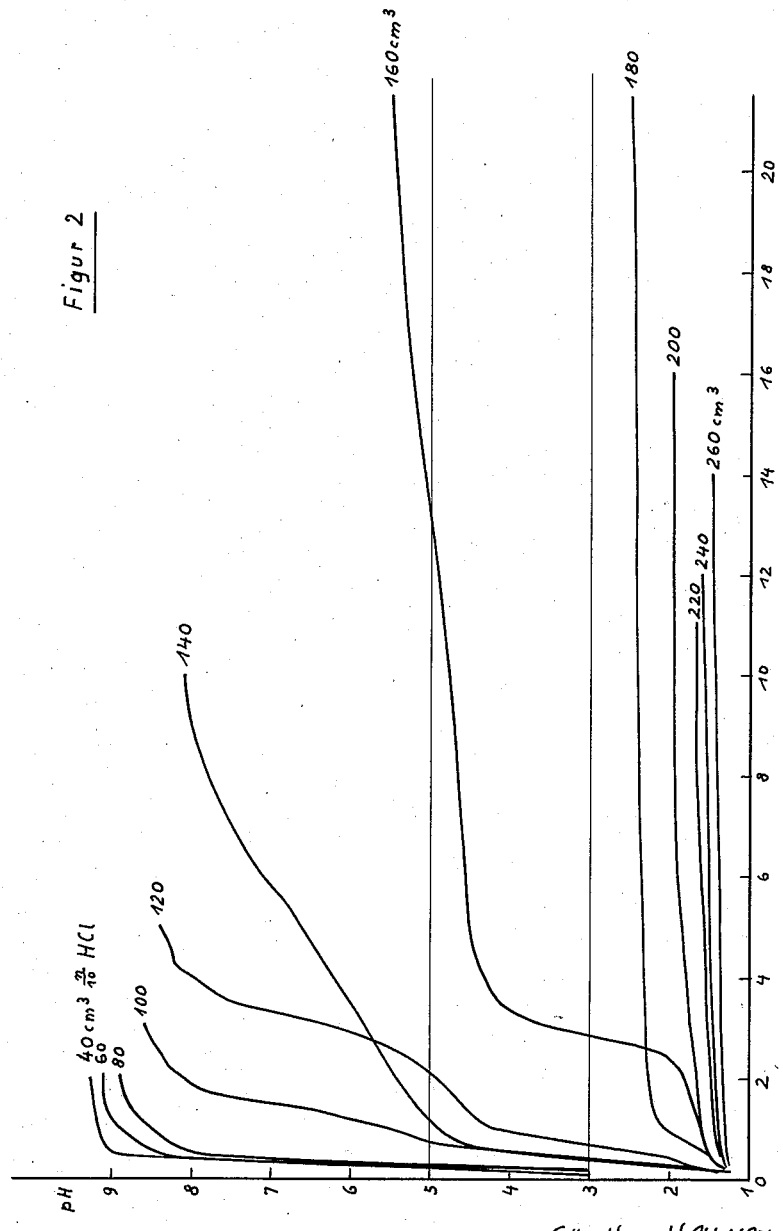

The above table and Fig. 2 show that this composition does not buffer but neutralizes in a wide range since obviously the hydrochloric acid is first used up by the magnesium hydroxide, forming magnesium chloride therewith. Some buffer effect can be observed only after the addition of considerable amounts of acid, in which instance, however, the pH value remains below 3.

As a further control, a mixture was prepared which contained, per gram, 0.9 g. of the magnesium aluminate hydrate of Example I and 0.1 g. of magnesium hydroxide. The same series of tests with the addition of given amounts of acid to 1 g. of this mixture was repeated, with the results given in Table 3 and illustrated in Fig. 3.

art. The curves indicate the time necessary for one gram of the indicated substance to adjust the pH of a given amount of n/10 HCl to 3. The superiority of magnesium aluminate hydrate is clearly shown.

EXAMPLE II

A sodium aluminate solution derived from 1 mol of aluminum sulfate and 14 mol sodium hydroxide was reacted with a solution containing 3.45 mols of magnesium chloride at a temperature of 20–22° C. under the same conditions as in Example I. The reaction product was decanted to remove most of the water-soluble salts. A 6% aqueous solution of the purified product was spray Table 3

| ccm. n/10 HCl: | | | | | | | | | | | | | | | | |
|---|---|---|---|---|---|---|---|---|---|---|---|---|---|---|---|---|
| 40 | Time | 12″ | 30″ | 60″ | 1.5′ | 2′ | 2.5′ | 3′ | 4′ | 5′ | 6′ | 10′ | 12′ | 15′ | 20′ | 28′ |
| | ph | 3.00 | 4.50 | 5.40 | 6.20 | 7.10 | 7.44 | 7.58 | 7.70 | 7.74 | 7.76 | 7.81 | 7.82 | 7.84 | 7.89 | 7.98 |
| 60 | Time | 13″ | 30″ | 60″ | 1.50′ | 2′ | 2.5′ | 3′ | 4′ | 5′ | 8′ | 10′ | 16′ | 20′ | 24′ | 28′ |
| | pH | 3.00 | 4.16 | 4.50 | 5.05 | 5.40 | 5.66 | 6.00 | 6.94 | 7.26 | 7.47 | 7.52 | 7.60 | 7.62 | 7.64 | 7.65 |
| 80 | Time | 10″ | 60″ | 2′ | 3′ | 4′ | 5′ | 7′ | 8′ | 9′ | 10′ | 12′ | 15′ | 20′ | 24′ | 28′ |
| | pH | 3.00 | 4.22 | 4.76 | 5.26 | 5.52 | 5.98 | 6.46 | 6.62 | 6.72 | 6.81 | 6.92 | 7.07 | 7.20 | 7.27 | 7.31 |
| 100 | Time | 12″ | 30″ | 60″ | 2′ | 3′ | 5′ | 6′ | 7′ | 8′ | 9′ | 12′ | 15′ | 20′ | 25′ | 28′ |
| | pH | 3.00 | 4.00 | 4.08 | 4.22 | 4.35 | 4.54 | 4.65 | 4.76 | 4.87 | 4.96 | 5.19 | 5.39 | 5.64 | 5.83 | 5.92 |
| 120 | Time | 20″ | 30″ | 60″ | 1.5′ | 2′ | 3′ | 4′ | 6′ | 8′ | 10′ | 12′ | 16′ | 20′ | 24′ | 28′ |
| | pH | 3.00 | 3.90 | 4.02 | 4.04 | 4.07 | 4.10 | 4.12 | 4.14 | 4.15 | 4.17 | 4.18 | 4.21 | 4.24 | 4.27 | 4.31 |
| 140 | Time | 15″ | 20″ | 23″ | 30″ | 60″ | 2′ | 3′ | 4′ | 6′ | 8′ | 10′ | 16′ | 20′ | 24′ | 28′ |
| | pH | 1.90 | 2.50 | 3.00 | 3.85 | 3.94 | 3.98 | 4.00 | 4.00 | 4.00 | 4.00 | 4.01 | 4.02 | 4.03 | 4.03 | 4.03 |
| 160 | Time | 15″ | 29″ | 33″ | 45″ | 60″ | 2′ | 3′ | 4′ | 6′ | 8′ | 10′ | 16′ | 20′ | 24′ | 28′ |
| | pH | 1.58 | 2.50 | 3.00 | 3.78 | 3.84 | 3.91 | 3.90 | 3.92 | 3.92 | 3.92 | 3.92 | 3.93 | 3.93 | 3.93 | 3.93 |
| 180 | Time | 23″ | 30″ | 37″ | 45″ | 60″ | 2′ | 3′ | 4′ | 6′ | 8′ | 10′ | 16′ | 20′ | 24′ | 28′ |
| | pH | 2.00 | 2.50 | 3.00 | 3.78 | 3.87 | 3.96 | 3.97 | 3.98 | 3.98 | 3.98 | 3.98 | 3.99 | 3.99 | 4.00 | 4.00 |
| 200 | Time | 15″ | 30″ | 44″ | 60″ | 2′ | 3′ | 4′ | 6′ | 8′ | 10′ | 12′ | 16′ | 20′ | 24′ | 28′ |
| | pH | 1.50 | 2.00 | 2.50 | 3.50 | 4.00 | 4.05 | 4.07 | 4.08 | 4.08 | 4.08 | 4.08 | 4.07 | 4.08 | 4.08 | 4.09 |
| 220 | Time | 15″ | 30″ | 45″ | 60″ | 86″ | 2′ | 3′ | 4′ | 5′ | 10′ | 12′ | 16′ | 20′ | 24′ | 28′ |
| | pH | 1.46 | 1.72 | 2.20 | 2.38 | 3.00 | 3.43 | 3.53 | 3.58 | 3.60 | 3.65 | 3.65 | 3.68 | 3.66 | 3.67 | 3.68 |
| 240 | Time | 15″ | 30″ | 45″ | 60″ | 1.5′ | 2′ | 3′ | 4′ | 5′ | 10′ | 12′ | 20′ | 24′ | 28′ | |
| | pH | 1.42 | 1.76 | 2.16 | 2.30 | 2.68 | 3.00 | 3.46 | 3.65 | 3.74 | 3.90 | 3.92 | 3.98 | 3.99 | 4.00 | |
| 250 | Time | 15″ | 30″ | 45″ | 60″ | 1.5′ | 2′ | 3′ | 4′ | 5′ | 10′ | 12′ | 16′ | 20′ | 24′ | 28′ |
| | pH | 1.34 | 1.66 | 1.82 | 2.13 | 2.43 | 2.66 | 3.05 | 3.35 | 3.51 | 3.72 | 3.75 | 3.79 | 3.82 | 3.84 | 3.94 |
| 260 | Time | 15″ | 30″ | 45″ | 60″ | 1.5′ | 2′ | 3′ | 4′ | 5′ | 8′ | 10′ | 15′ | 20′ | 24′ | 28′ |
| | pH | 1.49 | 1.67 | 1.86 | 2.04 | 2.30 | 2.46 | 2.70 | 2.90 | 3.08 | 3.45 | 3.56 | 3.69 | 3.74 | 3.77 | 3.79 |
| 270 | Time | 9″ | 30″ | 45″ | 60″ | 1.5′ | 3′ | 4′ | 5′ | 7′ | 10′ | 20′ | 24′ | 28′ | | |
| | pH | 3.00 | 4.10 | 4.26 | 4.42 | 5.04 | 6.22 | 6.88 | 7.09 | 7.25 | 7.39 | 7.59 | 7.66 | 7.70 | | |

Figure 3:
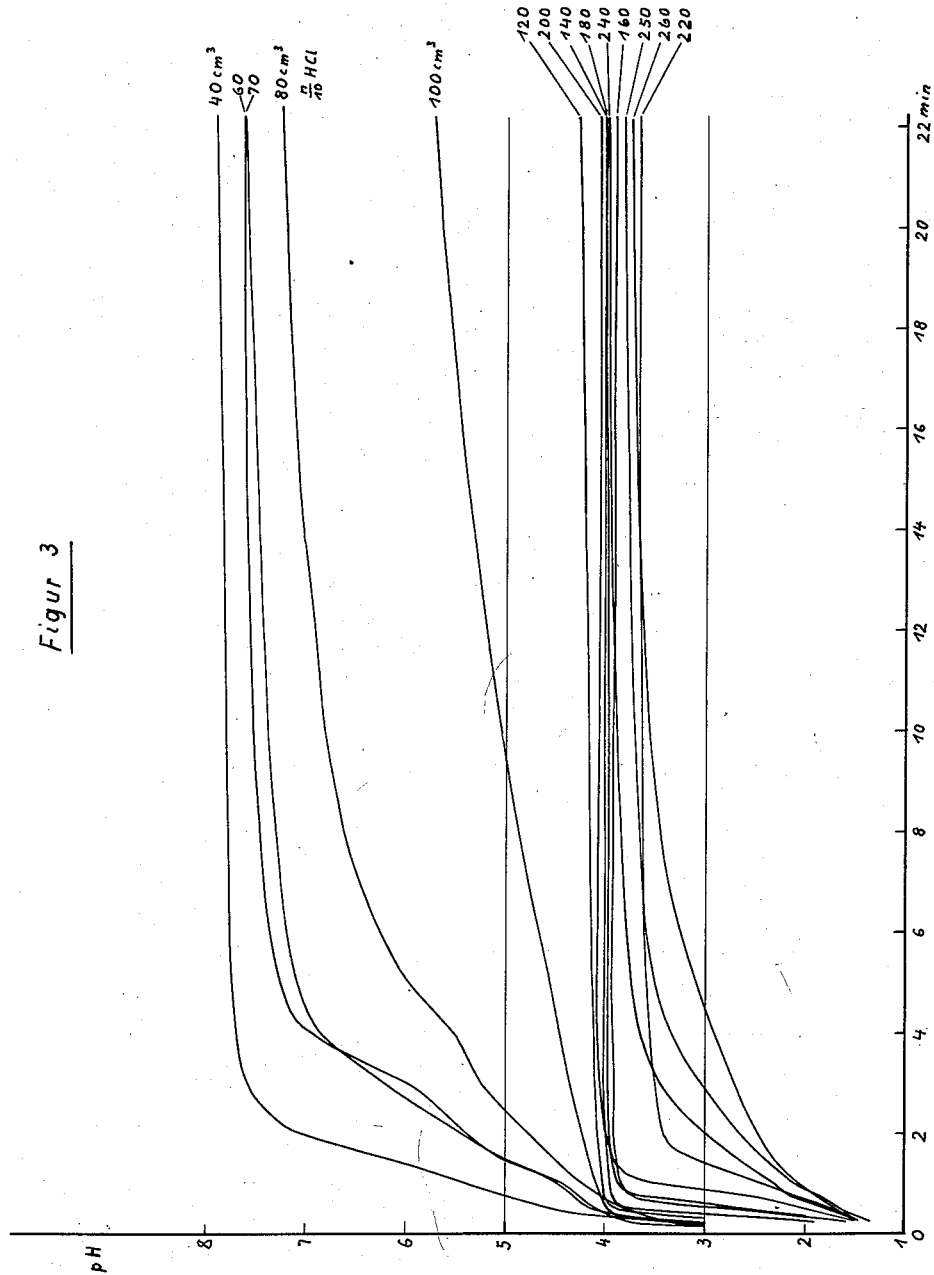

The above table and Fig. 3 show that the pH value is adjusted to 7–8 (neutralization of magnesium hydroxide) when small amounts of hydrochloric acid (40–80 ccm. per gram) are added. Results similar to those obtained with magnesium aluminate hydrate alone are obtained only with the addition of at least 120 ccm. of n/10 HCl/g.

Fig. 5 illustrates the different therapeutic activity of magnesium aluminate hydrate and antacids of the prior dried at a temperature of 80° C. The dry end product showed an atom-gram ratio of magnesium:aluminum of 2:1. The short drying period helped to produce a very fine and particularly effective product, as shown in Table 4 and Fig. 6 indicating the pH adjustment at different times after given amounts of n/10 HCl were reacted with 1 g. of the magnesium aluminate produced by the above process.

Table 4

| ccm. n/10 HCl | | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 40 | Time | 0 | 4" | 15" | 30" | 1' | 1.5' | 3 | 4 | 5 | 6 | 7 | 8 | 9 | 10 | 11 | 12 | 13 | 17 | 20 |
|    | pH   | 1.20 | 4.00 | 4.3 | 4.44 | 4.5 | 4.52 | 4.6 | 4.67 | 4.69 | 4.73 | 4.8 | 4.84 | 4.88 | 4.92 | 4.96 | 5.02 | 5.06 | 5.22 | 5.32 |
| 50 | Time | 0 | 0.5 | 1 | 1.5 | 2 | 3 | 4 | 5 | 6 | 9 | 12 | 15 | 18 | 20 | | | | | |
|    | pH   | 1.36 | 4.34 | 4.40 | 4.40 | 4.42 | 4.44 | 4.46 | 4.48 | 4.49 | 4.55 | 4.60 | 4.65 | 4.71 | 4.73 | | | | | |
| 60 | Time | 0 | 0.5 | 1 | 1.5 | 2 | 3 | 4 | 5 | 7 | 9 | 12 | 15 | 20 | 22 | 24 | | | | |
|    | pH   | 1.32 | 4.34 | 4.38 | 4.41 | 4.43 | 4.47 | 4.50 | 4.53 | 4.58 | 4.63 | 4.72 | 4.79 | 4.92 | 4.98 | 5.04 | | | | |
| 70 | Time | 0 | 0.5 | 1 | 2 | 3 | 5 | 6 | 9 | 12 | 15 | 20 | | | | | | | | |
|    | pH   | 1.32 | 4.18 | 4.18 | 4.18 | 4.18 | 4.18 | 4.18 | 4.18 | 4.18 | 4.18 | 4.18 | | | | | | | | |
| 80 | Time | 0 | 0.5 | 1 | 1.5 | 2.0 | 3 | 6 | 9 | 12 | 15 | 20 | | | | | | | | |
|    | pH   | 1.32 | 4.10 | 4.14 | 4.12 | 4.12 | 4.12 | 4.12 | 4.12 | 4.12 | 4.10 | 4.10 | | | | | | | | |
| 100 | Time | 0 | 0.5 | 1 | 1.5 | 2 | 3 | 4 | 5 | 6 | 7 | 13 | 15 | 20 | | | | | | |
|     | pH   | 1.32 | 4.07 | 4.07 | 4.07 | 4.07 | 4.06 | 4.06 | 4.06 | 4.06 | 4.05 | 4.04 | 4.04 | 4.02 | | | | | | |
| 120 | Time | 0 | 0.5 | 1 | 2 | 3 | 4 | 5 | 6 | 9 | 12 | 15 | 18 | 20 | | | | | | |
|     | pH   | 1.31 | 3.90 | 4.02 | 4.04 | 4.03 | 4.02 | 4.02 | 4.02 | 4.0 | 4.0 | 3.99 | 3.98 | 3.98 | | | | | | |
| 140 | Time | 0 | 0.5 | 1 | 1.5 | 2 | 3 | 4 | 6 | 9 | 12 | | | | | | | | | |
|     | pH   | 1.26 | 3.70 | 3.96 | 3.98 | 3.99 | 4.0 | 4.0 | 4.0 | 3.99 | 3.98 | | | | | | | | | |
| 160 | Time | 0 | 0.5 | 1 | 1.5 | 2 | 3 | 4 | 6 | 9 | | | | | | | | | | |
|     | pH   | 1.34 | 3.94 | 3.98 | 3.99 | 3.99 | 3.99 | 3.99 | 3.99 | 3.99 | | | | | | | | | | |
| 180 | Time | 0 | 0.5 | 1 | 1.5 | 2 | 3 | 4 | 8 | 12 | | | | | | | | | | |
|     | pH   | 1.36 | 1.56 | 3.40 | 3.94 | 3.98 | 4.0 | 4.0 | 4.0 | 4.0 | | | | | | | | | | |
| 200 | Time | 0 | 15" | 30" | 1' | 1.5 | 2 | 3 | 4 | 5 | 8 | | | | | | | | | |
|     | pH   | 1.22 | 1.6 | 3.7 | 3.82 | 3.86 | 3.86 | 3.87 | 3.87 | 3.90 | 3.88 | | | | | | | | | |
| 220 | Time | 0 | 0.5 | 1 | 1.5 | 2 | 3 | 4 | 5 | 6 | 7 | 8 | 9 | 10 | 11 | 13 | 14 | 16 | 18 | 20 |
|     | pH   | 1.22 | 1.9 | 3.72 | 3.82 | 3.86 | 3.88 | 3.89 | 3.90 | 3.90 | 3.90 | 3.90 | 3.90 | 3.90 | 3.90 | 3.90 | 3.90 | 3.90 | 3.92 | 3.92 |
| 240 | Time | 0 | 1.5 | 1 | 1.5 | 2 | 3 | 4 | 5 | 6 | 7 | 8 | 9 | 10 | 11 | 12 | 14 | 16 | 18 | 20 |
|     | pH   | 1.22 | 1.54 | 2.46 | 3 | 3.42 | 3.54 | 3.56 | 3.58 | 3.59 | 3.6 | 3.62 | 3.62 | 3.62 | 3.62 | 3.62 | 3.62 | 3.63 | 3.64 | 3.66 |
| 250 | Time | 0 | 0.5 | 1 | 1.5 | 2 | 3 | 4 | 5 | 6 | 12 | 15 | 20 | | | | | | | |
|     | pH   | 1.38 | 2.04 | 2.32 | 2.40 | 2.44 | 2.49 | 2.49 | 2.50 | 2.50 | 2.50 | 2.50 | 2.50 | | | | | | | |
| 260 | Time | 0 | 0.5 | 1 | 1.5 | 2 | 3 | 4 | 6 | 9 | | | | | | | | | | |
|     | pH   | 1.38 | 1.92 | 2.17 | 2.19 | 2.20 | 2.20 | 2.20 | 2.20 | 2.20 | | | | | | | | | | |

EXAMPLE III 1 kg. aluminum chloride+6H$_2$O were dissolved in 2 kg. water and reacted with a solution of 1.2 kg. sodium hydroxide in 2.5 kg. water, under constant stirring. The resultant sodium aluminate solution was cooled to about 20° C. and, with thorough stirring, it was reacted with 3.5 kg. of a magnesium sulfate solution produced by dissolving 1 kg. of magnesium sulfate anhydride in 2.5 kg. water. The magnesium sulfate solution was introduced in a plurality of thin jets through several shower heads to avoid localized differences of concentration as much as possible. The reaction resulted in a colloidal precipitate. After all the magnesium sulfate was added, stirring was continued for about half an hour. Purification, drying and pulverization proceeded as in Example I. The yield was 870 g. equal to 99% of theoretical, calculated on the assumed formula

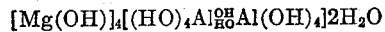

with a molecular weight of 425.

EXAMPLE IV 500 g. Al$_2$(SO$_4$)$_3$.9H$_2$O were dissolved in 2 liters of water and reacted with a solution of 560 g. NaOH in 1.5 liter water, under constant stirring. This solution of an aluminate was mixed as in Example III with a solution of 1,170 g. MgBr$_2$.6H$_2$O in 2.5 liter water, the further treatment corresponding exactly to Example III. The yield amounted to 405 g., 96% of the theory.

EXAMPLE V 500 g. AlBr$_3$.6H$_2$O were dissolved in 1 liter of water and reacted with a solution of 372 g. NaOH in 1 liter of water, under stirring. This solution of an aluminate was mixed with a solution of 572 g.

in 1.5 liter of water as in Example III, the further treatment was carried out as in Example III. The yield amounted to 264 g., 93% of the theory.

EXAMPLE VI 500 g. Al(NO$_3$)$_3$.9H$_2$O were dissolved in 1.5 liter of water and reacted with 360 g. NaOH in 1 liter of water. This solution was mixed, as described in Example III, with a solution of 690 g. Mg(NO$_3$)$_2$.6H$_2$O in 1.5 liters of water. The further treatment was carried out as in Example III. The yield amounted to 276 g., 98% of the theory.

Preferably the new compound is administered to the gastric juice in the form of tabloids containing at least 0.3 g. magnesium aluminum hydroxide.

While the invention has been illustrated by certain specific examples, it will be clearly understood that many modifications and variations may occur to the skilled in the art without departing from the spirit and scope of the invention as defined in the appended claims.

What is claimed is:

1. A process for the preparation of a magnesium aluminate hydrate, comprising the steps of thoroughly mixing together and reacting at a temperature of about 0° C. to 50° C. an alkali aluminate solution containing 3–5 mols of an alkali metal oxide selected from the group consisting of sodium oxide and potassium oxide per mol of Al$_2$O$_3$ with a magnesium salt solution, the magnesium salt being selected from the group consisting of the sulfate, chloride, bromide, iodide, nitrate and acetate of magnesium, the amount of magnesium salt solution in the reaction mixture being such that the atom-gram ratio of aluminum:magnesium is 1:0.9–3, separating the precipitated magnesium aluminate hydrate from the reaction mixture and washing the precipitate until it contains no more than about 0.5% of water-soluble salts.

2. The process of claim 1, wherein the reaction temperature is between about 20 and 50° C.

3. The process of claim 1, wherein the alkali aluminate solution has a pH of about 12–13.

4. The process of claim 1, wherein the alkali aluminate solution is the reaction product of a solution of an aluminum salt selected from the group consisting of the chloride, bromide, sulfate and nitrate of aluminum, and an alkali metal hydroxide selected from the group consisting of sodium hydroxide and potassium hydroxide, the ratio between aluminum and alkali metal hydroxide being 6–8 mols of the hydroxide to one mol of aluminum oxide, i.e. 3–4 mols of the hydroxide to one gram-atom of aluminum.

5. A process for the preparation of a magnesium aluminate hydrate antacid, comprising the steps of thoroughly mixing together and reacting at a temperature between about 0 and 50° C. an alkali aluminate solution containing 3–5 mols of an alkali metal oxide selected from the group consisting of sodium oxide and potassium oxide per mol of Al$_2$O$_3$, the alkali aluminate solution being the reaction product of a solution of an aluminum salt selected from the group consisting of the chloride, bromide, sulfate and nitrate of aluminum, with a magnesium salt solution, the magnesium salt being selected from the group consisting of the sulfate, chloride, bromide, iodide, nitrate and acetate of magnesium, the amount of magnesium salt solution in the reaction mixture being such that the atom-gram ratio of aluminum:magnesium is 1:2, separating the precipitated magnesium aluminate hydrate from the reaction mixture and washing the precipitate until it contains no more than about 0.5% of water-soluble salts.

6. The process of claim 5, wherein the magnesium salt solution is added to the alkali aluminate solution in the form of thin jets to assure even distribution of the magnesium salt solution in the alkali aluminate solution.

7. The process of claim 5, comprising the step of drying the washed magnesium aluminate hydrate in vacuo at a temperature of about 50 to 70° C.

8. A process for the preparation of a magnesium aluminate hydrate antacid, comprising the steps of thoroughly mixing together and reacting at a temperature between about 0° C. and 20° C. an alkali aluminate solution containing 3–5 mols of an alkali metal oxide selected from the group consisting of sodium oxide and potassium oxide per mol of $Al_2O_3$, the alkali aluminate solution being the reaction product of a solution of an aluminum salt selected from the group consisting of the chloride, bromide, sulfate and nitrate of aluminum, with a magnesium salt solution, the magnesium salt being selected from the group consisting of the sulfate, chloride, bromide, iodide, nitrate and acetate of magnesium, the amount of magnesium salt solution in the reaction mixture being such that the atom-gram ratio of aluminum:magnesium is 1:2, separating the precipitated magnesium aluminum hydrate from the reaction mixture, washing the precipitate until it contains no more than about 0.5% of water-soluble salts, drying the washed magnesium aluminate hydrate in vacuo at a temperature of about 50 to 70° C., and comminuting the dried product to a particle size of 2,500 to 3,600 mesh/cm.$^2$.

9. A process for the preparation of a magnesium aluminate hydrate antacid, comprising the steps of thoroughly mixing together and reacting at a temperature between about 0° C. and 20° C. an alkali aluminate solution containing 3–5 mols of an alkali metal oxide selected from the group consisting of sodium oxide and potassium oxide per mol of $Al_2O_3$, the alkali aluminate solution being the reaction product of a solution of an aluminum salt selected from the group consisting of the chloride, bromide, sulfate and nitrate of aluminum, with a magnesium salt solution, the magnesium salt being selected from the group consisting of the sulfate, chloride, bromide, iodide, nitrate and acetate of magnesium, the amount of magnesium salt solution in the reaction mixture being such that the atom-gram ratio of aluminum:magnesium is 1:2, separating the precipitated magnesium aluminum hydrate from the reaction mixture, washing the precipitate until it contains no more than about 0.5% of water-soluble salts, forming a 6–15% suspension of the precipitate and spray drying the same at a temperature of about 60 to 100° C.

10. Magnesium aluminate hydrate soluble in diluted n/10 HCl in the cold, the watery suspension having a pH value of about 9–11 and having the property to bind HCl in the ratio 1 mol:14 mol, the substance being a white powder which is nearly tasteless, absolutely without smell and has a mol ratio of magnesium:aluminum:water of 4:2:9.

11. A method of stabilizing the pH value of gastric juice, which is an acid medium having a pH between 3 and 5, comprising the step of adding a buffer comprising essentially magnesium aluminate hydrate as defined in claim 10 to the gastric juice.

12. A method of stabilizing the pH value of gastric juice containing hydrochloric acid, comprising the step of adding a buffer comprising essentially magnesium aluminate hydrate to the gastric juice in the ratio of 1 g. of the magnesium aluminate hydrate to 70–260 c.c.m. of n/10 acid.

13. Process for stabilizing the pH value of gastric juice to 3–5, comprising administering to the stomach tabloids containing at least 0.3 g. magnesium aluminate hydrate as defined in claim 10.

References Cited in the file of this patent

UNITED STATES PATENTS 2,570,532     Eisenberg  ---------------- Oct. 9, 1951

OTHER REFERENCES

Chem. Abst., vol. 36, 1942, pp. 5721[4] and 6930[4].
Chem. Abst., vol. 39, 1945, pp. 3748[9] and 3749[1].